Dec. 5, 1967                    R. B. GALL                    3,356,988
                          BATTERY TERMINAL CLAMP
                           Filed Dec. 22, 1965
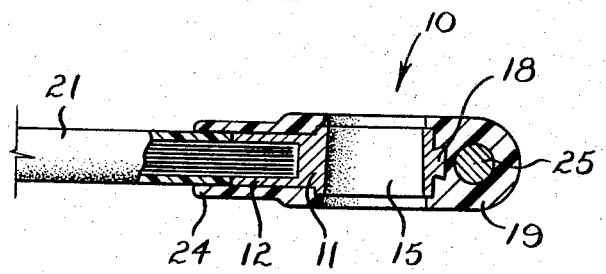
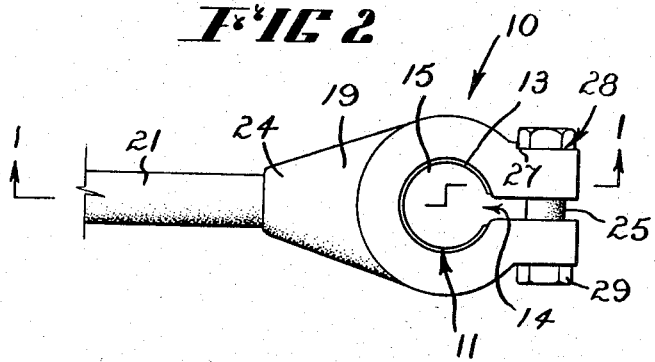
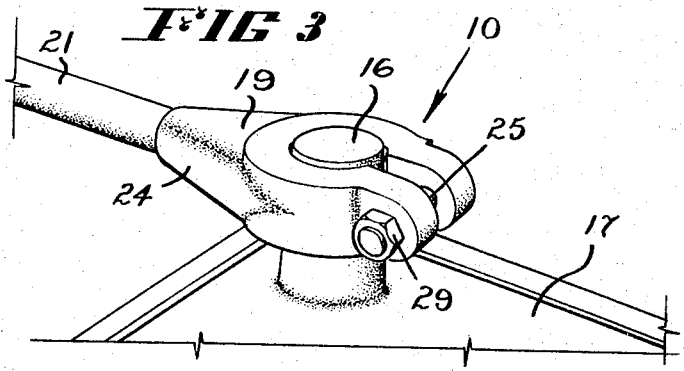

United States Patent Office 3,356,988
Patented Dec. 5, 1967

3,356,988
BATTERY TERMINAL CLAMP
Richard B. Gall, Camden, South Australia, Australia, assignor to Camelec Limited, Camden, South Australia, Australia
Filed Dec. 22, 1965, Ser. No. 515,700
Claims priority, application Australia, Dec. 29, 1964, 53,386/64
2 Claims. (Cl. 339—230)

ABSTRACT OF THE DISCLOSURE

A battery terminal clamp having an inner contact member of lead and an outer casing of resilient organic plastics material interlocking with the inner contact in such a way as to restrain the inner contact against permanent deformation.

This invention relates to a terminal clamp for clamping to a lead cell battery.

Two main types of clamp have been used heretofore for the clamping to the post of a lead cell battery. The first type is a cast lead type of clamp, and this is preferred to other types since the material can be of antimonial lead, the same as the material from which the battery post is made, so that electrolysis is substantially reduced. The antimonial lead alloy used for the post comprises mainly lead (above ninety percent, usually 94%–96%) with the remainder antimony. However this specification employs the term "lead" in the usual trade sense to include antimonial lead. However, the cast type of clamp is subject to the serious objection that it permanently deforms and tends to creep, and removal from the terminal post and subsequent replacement becomes unsatisfactory in that the contact area is reduced.

The second type of battery clamp which has been used heretofore has been a cast brass clamp, and although this does not acquire a permanent set to the same degree as an antimonial lead post, nevertheless being of different material electrolysis tends to cause corrosion, and this is accelerated in the event of the clamp becoming moist and being attacked by the $SO_3$ fumes, or alternatively being splashed by sulphuric acid from the battery. A further problem which is encountered with the brass type of clamp is that it tends to deform the surface of the battery post more than the lead clamps.

The main object of this invention therefore is to provide a battery terminal clamp which includes a lead contact member or a contact member having a lead contact surface, and therefore does not tend to set up electrolysis or corrosion when secured to a battery post, but which will include means to apply some restraining force against the acquiring of a permanent deformation, thus reducing such permanent deformation and consequent loss of contact area.

In its simplest form the invention may be said to consist of a battery terminal clamp wherein a contact member having a contact surface of lead contains a cable attachment means, the contact member having an inner contact surface of lead and being of size and shape complementary to the size and shape of the outer surface of a battery post, characterized by a casing of organic plastics material firmly engaging the outer surface of the contact member, the casing having a plastic memory and restraining against permanent deformation of the contact member.

An embodiment of the invention is described hereunder in some detail with reference to and is illustrated in the accompanying drawings, in which:

FIG. 1 is a section of a battery terminal clamp,

FIG. 2 is a plan of same, showing as line 1—1 the line on which the section of FIG. 1 is drawn, and FIG. 3 is a perspective view of the terminal clamp secured to the terminal post of a battery.

According to this embodiment a battery terminal clamp 10 comprises a bifurcated lead contact member 11 (which is made of antimonial lead containing from 90% to 96% lead and from 10% to 4% antimony). The contact member 11 has a lug 12 containing a socket projecting out in one direction. The lug 12 terminates in the other direction in a bifurcated circular portion 13 having a gap designated 14 opposite the lug 12, the circular member having an inner tapered surface 15 complementary to the size and shape of a tapered post 16 of a battery 17. The outer surface of the circular portion 13 of the contact member 11 has a projection 18 the side walls of which are of under cut shape, and this provides a "dove-tail" interconnection between an outer casing 19 formed from a moulding of rigid P.V.C. The outer casing 19 is formed by a subsequent moulding operation around the outer surface of the contact member 11.

A cable 21 has its ends enclosed and firmly gripped by the walls of the lug 12, the cable in this embodiment being coated with an organic plastic material to form an insulator around the outer surface thereof. This firm grip is achieved in this embodiment by casting the lug 12 around the cable end and then by moulding the rigid P.V.C. which shrinks upon cooling.

The moulding of rigid P.V.C. of the outer casing 19 is formed by moulding over the assembly of the cable and the contact member, and this moulding includes a tail 24 surrounding and firmly gripping the cable thus limiting or preventing ingress of moisture or acid to the joint between the cable and the lug of the contact member, which constitutes a source of potential electrolytic action because of the contact between dissimilar metals. The moulding in extending around the contact member firmly grips the annular projection as said above. The moulded casing 19 is bifurcated in a manner similar to the contact member in that it has a gap at the side of the contact member opposite the lug, and a locking bolt 25 passes through an aperture in the casing normal to the gap so that the contact member can be clamped with the locking bolt around the battery post 16 without any electrical connection between the bolt and the post. The casing 19 contains a recess 27 which has a bolt head support face 28 so that the locking bolt is prevented from turning when the nut 29 thereon is tightened or loosened.

Since rigid P.V.C. has a superior plastic memory to lead, it will be seen that when the locking bolt is released the clamp tends to open, and the elastic resilience of the combination of the contact member and the molding of P.V.C. is superior to that of lead alone. Other organic plastics with good plastic memory can of course be used. Further it will be seen that the bolt is insulated away from the contact member since it passes only through the moulding, and thus the danger of electrolysis between the bolt and the contact member is substantially removed. Furthermore it will be appreciated that the cable is substantially protected where it enters the lug, this of course being a troublesome joint with the usual battery terminal clamp.

The invention may also be applied to clamps of the spring type or closed cap type, which in both instances are considerably improved by utilizing the plastic memory characteristics of resin based plastics material when firmly engaged thereby. Further it will be seen that the gap of a bifurcated clamp, if this is used, need not necessarily be opposite the socket.

What I claim is:

1. A battery terminal clamp comprising a contact member with cable attachment means, the contact member having an inner contact surface of lead and being of size and shape complementary to the size and shape of the outer surface of a battery post, the contact member also having a projection extending outwardly therefrom, the side walls of the projection sloping inwardly towards the base thereof thereby forming a "dove-tail" cross-sectional shape, and an outer casing of organic plastics material firmly engaging the outer surface of the contact member and interlocking with the "dove-tail" shape thereof, the casing having a plastic memory and restraining the contact member against permanent deformation.

2. A battery terminal clamp according to claim 1 wherein the contact member and outer casing are bifurcated, the bifurcated end of the outer casing containing apertures, the clamp further comprising locking bolts extending through the apertures and contacting only the casing and not the contact member, said cable attachment means being constituted by a socket, and an insulated cable having an end portion of its conductive core contained within the socket and firmly engaged by the walls thereof, said casing of organic plastics material enveloping the walls of the socket and firmly engaging the outer surface of the cable insulation.

References Cited
UNITED STATES PATENTS

| | | | |
|---|---|---|---|
| 1,794,812 | 3/1931 | Ward | 339—230 |
| 2,487,917 | 11/1949 | Adams | 339—230 X |
| 2,623,085 | 12/1952 | Gier | 339—228 X |
| 2,818,552 | 12/1957 | Zam | 339—230 X |
| 3,256,511 | 6/1966 | Herrman | 339—228 |

FOREIGN PATENTS

| | | |
|---|---|---|
| 70,193 | 10/1958 | France. |

MARVIN A. CHAMPION, *Primary Examiner.*

PERRY TEITELBAUM, *Assistant Examiner.*